United States Patent [19]

Uotila

[11] 4,326,683

[45] Apr. 27, 1982

[54] PARACHUTE WITH LOW OPENING SHOCK AND HIGH STABILITY

[76] Inventor: Jarmo I. Uotila, ISO Roobertinkatu 52 A6, Helsinki 12, Finland, 00120

[21] Appl. No.: 92,650

[22] Filed: Nov. 9, 1979

Related U.S. Application Data

[63] Continuation-in-part of Ser. No. 898,802, Apr. 28, 1978, abandoned.

[30] Foreign Application Priority Data

Apr. 22, 1977 [FI] Finland ............................... 771282

[51] Int. Cl.³ ...................... B64D 17/02; B64D 17/18
[52] U.S. Cl. .................................................. 244/145
[58] Field of Search ....................... 244/142, 145, 152

[56] References Cited

U.S. PATENT DOCUMENTS

| | | | |
|---|---|---|---|
| 1,685,688 | 9/1928 | Thornblad | 244/145 |
| 2,096,520 | 10/1937 | Knight | 244/145 |
| 2,409,562 | 10/1946 | Hastings | 244/145 |
| 2,851,389 | 9/1958 | Lappala | 244/145 |
| 3,195,842 | 7/1965 | Wilson | 244/145 |

FOREIGN PATENT DOCUMENTS

| | | | |
|---|---|---|---|
| 521166 | 7/1953 | Belgium | 244/145 |
| 1061475 | 11/1955 | France | 244/145 |

OTHER PUBLICATIONS

Heinrich et al., "Stability and Drag of Parachutes with Varying Effective Porosity", AFFDL-TR-71-58, 1971.

*Primary Examiner*—Galen L. Barefoot
*Attorney, Agent, or Firm*—McGlew and Tuttle

[57] ABSTRACT

A parachute comprising a non-porous canopy having an outer peripheral skirt and a substantially centrally located vent. The canopy includes a plurality of circumferentially spaced holes which are all spaced from the vent and which are confined within a zone of the canopy between 40 and 80% of the radial distance from the center of the vent to the skirt. The total area of the holes is between 10 to 25% of the total area of the canopy.

9 Claims, 5 Drawing Figures

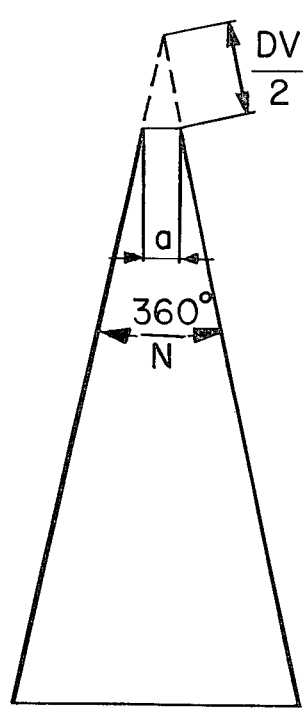
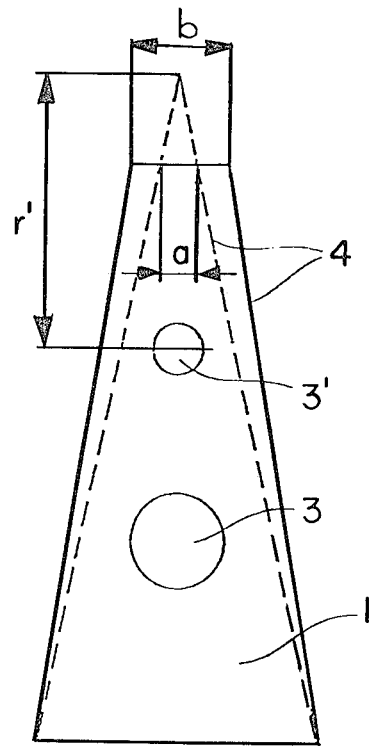
FIG. 4
FIG. 5

PARACHUTE WITH LOW OPENING SHOCK AND HIGH STABILITY

This application is a continuation-in-part of Ser. No. 898,802, Apr. 28, 1978, now abandoned.

FIELD AND BACKGROUND OF THE INVENTION

The subject of the invention is a parachute, whose canopy has a selected geometric porosity which is formed of holes, openings, and the like. In known parachutes, porosity is formed primarily by the inherent porosity of the parachute cloth. In more expensive special parachutes it is also known to build different vents into the canopy either for better stability or to lower opening shock.

Known parachute types and constructions however, cannot be directly constructed of non-porous plastic film or plastic coated cloth, which usually are weaker than parachute cloth. The reason for this is that, with known parachute constructions, it is impossible to overcome the unstability and high opening loads which follow from the use of non-porous material. It is known to utilize geometric porosity in certain cases either to improve stability, or in other cases, to lower the opening shock. A parachute construction, however, has not been suggested which would enable the use of non-porous and usually weaker material than regular parachute cloth, which simultaneously has good stability and a low enough opening shock to enable the use of the low strength material.

The opening shock for a regular parachute which is constructed of non-porous material can be four times the steady state drag force in the so-called infinite mass case. This situation exists under test conditions (in wind tunnels), but in normal use, under the so-called finite mass conditions, the mentioned opening shock ratio remarkably becomes even higher. This sets such high requirements for the material strength that they cannot be fulfilled with practical film thicknesses. Neither can enough stability be reached. Deflection angles of these parachutes reach 45° and there exist strong oscillations in practice.

Textile cloth parachutes have a deflection angle of about 20°–30°, the opening shock factor is about 2 and the parachute has a tendency to oscillate. Nylon cloth, however, is expensive and can cost many times the price of, for example, polyethylene or polypropylene films of suitable thickness. Therefore, the purpose of the invention is to find means to use non-porous material in parachutes having their opening shock and stability characteristics at least equal or even essentially better than the textile cloth parachutes and which parachutes of non-porous, inexpensive material would apply for example to cargo parachutes, brake chutes and ammunition chutes especially for one way or one time use.

As already mentioned, it is known to use geometric porosity to improve the strength and to lower the opening shock, deflection angle and oscillation of parachutes. As an example, one can mention such a parachute construction where the canopy is composed of elements having slots between each other. The often used ribbon parachute is of this type in which every gore is built of numerous ribbons with open space between each other. For example, from U.S. Pat. No. 3,218,007 there is known a combination of a regular parachute and a ribbon parachute, where the stability of the parachute is improved by making part of the gores of ribbons. However, due to the complicated manufacturing technique of the ribbon parachute one loses practically completely the advantage which would follow from the use of low cost material. From U.S. Pat. No. 3,284,032 there is known a parachute which has been stabilized by adding, to a regular solid flat parachute, a cylindrical band in such a manner that there is a gap between these two parts. From the known constructions this patentable construction would probably be best suited to be built also of plastic film. However, this known parachute has been built mainly of textile cloth. Fully satisfying results cannot be achieved even with this construction if manufactured of non-porous film. The gap between the disc and the band is too near the skirt of the parachute so that the air flowing out of the gap can not affect the overall air flow around the circular disc and the disc acts as an unstable smaller parachute which has a remarkably high opening shock. The cylindrical band however functions as a stabilizer and limits the overall deflection and oscillation to reasonably low values. The disc portion would not withstand the opening shock if it would be manufactured of non-porous film. In addition, the separate manufacture of the flat disc and the cylindrical band requires remarkably more work than if the whole canopy could be manufactured of uniform film, for example of uniform triangular gores.

SUMMARY OF THE INVENTION

The purpose of the invention is to obtain such a parachute, which is composed of uniform non-porous film, for example of triangular gores. Therefore, the manufacture of this parachute would require minimum amounts of material and work. Further, the parachute should be stable, i.e. its deflection and oscillation should be low or practically non-existent and its opening shock should be only slightly, for example 1.6 times, higher than the steady state drag force.

The starting point of the invention is an assumption that the high instability of the excessive opening shock of conventional parachutes made of non-porous material, are a direct consequence of the non-porosity of the material. Based on this assumption, the particular purpose of the invention is to find an answer to the question of whether it is possible to make the film porous in such a manner that the both previously mentioned unfavorable characteristics could be avoided simultaneously.

The previously described problems have surprisingly been solved according to the invention. In the inventive parachute, a uniform non-porous canopy material is used from vent to skirt with holes in a zone which is positioned between 40-80% of the way from the vent toward the skirt. The total area of the hoes is 5-25% of the total canopy area and at best about 15% of the total canopy area with an advantageous range of 10 to 25%.

This positioning of the holes has both a functional meaning and a constructional meaning for the manufacturing of the parachute. The air flow through the holes separates, in a proper place, that air flow on the outside of the canopy which causes the deflection or oscillations. In order to lower opening shock, the mentioned zone is also, in practical tests, proven to be the most favorable location for the holes. An equal area of holes outside the mentioned zone causes a remarkably higher opening shock. For example, holes placed near the skirt caused the parachute to act like a smaller parachute without holes and usually without exception splits near the vent due to the high opening shock. At the previously mentioned zone there is possible to placement holes of a sufficient total area in such a manner that the edges of at best triangular gores, of which the parachute is composed, remain in tact which face has an important effect on the manufacture and the strength of the parachute.

It has been found that the holes in the mentioned zone, even though they slow down and smooth the overall inflation, do not decrease the stresses in the area near the vent opening, which is still subject to the high pressure loadings due to the rapid initial inflation period. This problem is solved in the invention in that the width of the imaginable gore at the vent opening is essentially larger than $D_v \sin(180°/N)$, where $D_v$ is the diameter of the vent and N is the number of gores.

Accordingly an object of the present invention is to provide a parachute comprising a non-porous canopy having an outer peripheral skirt and a substantially centrally located vent, said canopy including a plurality of circumferentially spaced holes each spaced from said vent, said plurality of holes disposed in a zone of the canopy which is defined between 40 and 80% of the radial distance from the center of the vent to said skirt, the total area of said holes being from 10 to 25% of the total area of said canopy.

Another object of the present invention is to provide a parachute which comprises a plurality of circumferentially disposed triangular gores each having a width in the central vent which is larger than $D_v \sin(180°/N)$, where $D_v$ is the diameter of the vent and N is the number of gores in the parachute canopy.

A further object of the present invention is to provide a parachute which is made of non-porous plastic material which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a top plan view of one gore of a flat parachute; and

FIG. 5 is a top plan view, according to the invention of an altered gore pattern in order to decrease the stresses in the vent area.

DETAILED DESCRIPTION OF THE PREFERRED EMBODIMENTS

Figure 1:
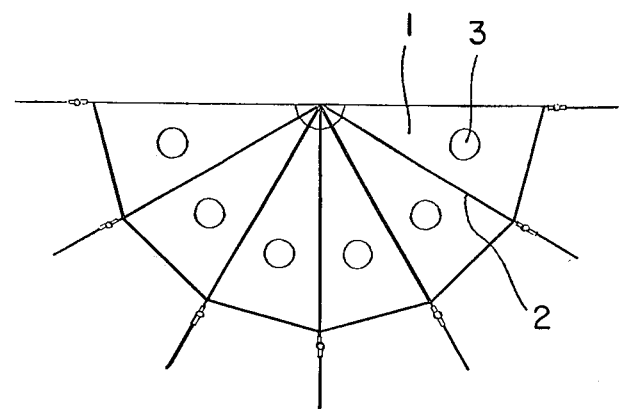
FIG. 1 is a top plan view of half of the inventive parachute.
Figure 2:
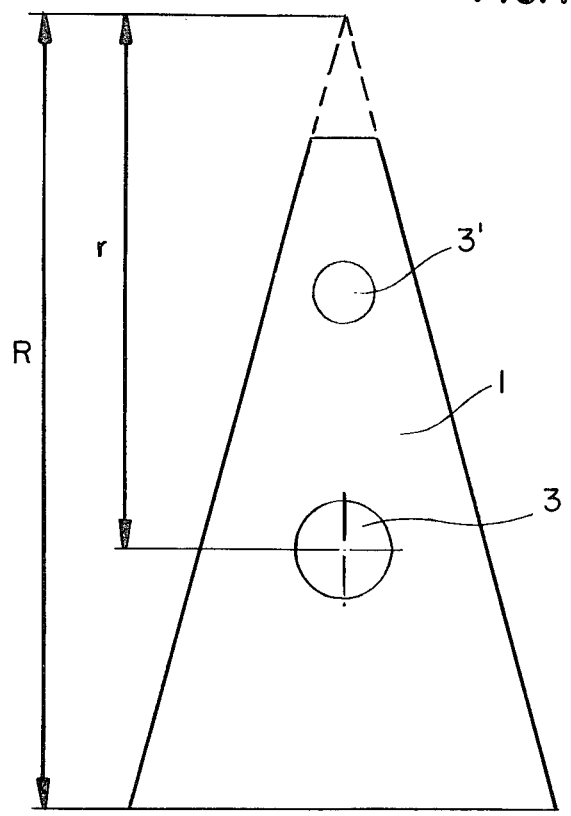
FIG. 2 is a top plan view of one gore of another version of the inventive parachute.

The inventive parachute consists mainly of triangular gores 1, made of non-porous film, like plastic film. The gores are at best heat sealed together at and with seams 2. The gore 1 contains holes 3 in such a manner, that the seaming zone 2 remains intact. The holes 3 are located in a zone which is limited between 40 to 80% of the radial distance from the center of the canopy to its skirt. Practical tests have proven that the optimum of the ratio r/R is 0.67. The geometric porosity due to the holes, is the total area of the holes as a percentage of the total canopy area can vary between 5–25%, being at best 15% and advantageously between 10 to 25%. The figures present the holes 3 round and in FIG. 2 there is additionally another hole 3' near the vent in the gore. The use of this other hole is not necessary, but it is, in certain applications, advantageous. Namely, with proper dimensioning, it causes the single parachute to function in clearly separable phases, like a multistage parachute system. However, the shape, size and number of the holes 3, 3' can vary arbitrarily when only the total geometric porosity due to the holes on the previously mentioned zone of the gore is within the mentioned limits. This is possible also with a large number of small holes, which locate on the mentioned place of the gore.

Figure 3:
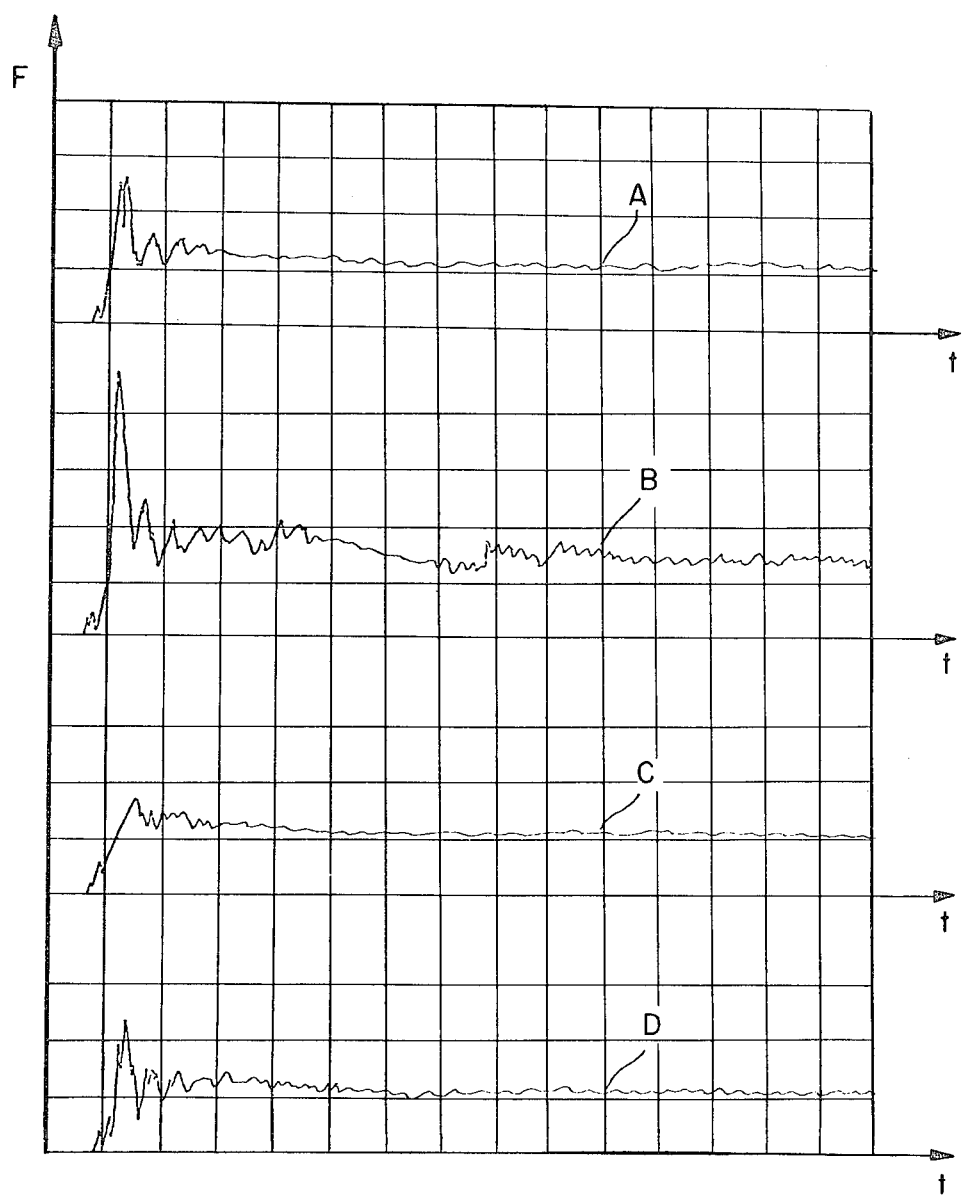
FIG. 3 is the opening shock diagrams of different model parachutes, measured in wind tunnel and especially presenting the different opening shocks of different parachute types.

The effect of the holes, when arranged according to the invention, can be seen from the diagram of the FIG. 3. On the horizontal axis there is plotted the time t, so that we can see the situation before, during and after the inflation phase of the parachute. On the vertical axis there is plotted the drag force F. The dimensioning is relative so that no absolute values are shown for the curves. From the figures, one can see the so-called "X-factor", i.e. the ratio of the maximum force during the inflation to the steady state force. Also the inflation time $t_f$ can be seen.

The curve A belongs to the regular solid flat parachute of normal parachute cloth, curve B to a solid flat parachute of plastic film, curve C to a plastic film parachute with 15% holes placed according to the invention and curve D belongs to a plastic film parachute with 20% holes placed to 82% of the canopy radius. The following table presents the x-factor and the filling time $t_f$ of different parachute types under similar test conditions.

| Type of parachute | x-factor | $t_f$ |
|---|---|---|
| A (solid textile cloth) | 2.3 | 0.035 sec |
| B (solid plastic film) | 3–4 | 0.03 sec |
| C (plastic film with holes according to invention) | 1.6 | 0.07 sec |
| D (plastic film with holes on the limits of the invention) | 2.3 | 0.04 sec |

In the tests, it was also found that the deflection angle of the invented parachute was only ±5° and oscillations were insignificant, which reflects also from curve C of FIG. 3.

The holes do slow down and smooth the inflation only when the inflation has reached the first zone of holes. This has been established both with models in wind tunnel tests and in test drops with larger prototypes. The effect of the holes probably follows from the outflow of air through the holes, which outflow can take place in larger amounts only after the "bubble", formed of the stagnated air inside the canopy, has grown to the zone in question. So, the innermost vent area is still subject to the high pressure loadings due to the rapid initial inflation and these stresses cannot be reduced with any holes.

The stresses near the vent can be relieved by increasing the width of the gore 1 in the vent area, as shown in FIG. 5. Now the extra bulge of the canopy material reduces the stress of the material due to the pressure loading. For example, a 50% increase (b-a) of the vent width reduces the stress at the point of maximum stress, on the upper edge of the hole 3', to about half when compared to the normal construction. Here, it is assumed that the upper hole 3' is located at about r'=40% and that the parachute in its inflated shape is practically flat up to the upper holes 3'. The breaking elongation is additionally assumed to be 5%.

The width (a) of a normal gore in the vent area, is $D_v\sin(180°/N)$, where N is the number of gores and $D_v$ is the diameter of the vent opening. The increased width (b) at the vent, is essentially larger than the normal width (a). The extra width 4 in the gore 1 decreases uniformly towards the skirt in such a manner, that the sides of the gore remain essentially straight.

In a parachute without holes, the increase of the gore width at vent does not offer any advantage, because the inflation of the parachute continues equally rapid towards the skirt, the stresses of which, an increase of the vent width only, does not relieve. The parachute is as strong as its weakest point, of course.

The invention thus offers an essentially easier and more inexpensive way to manufacture parachutes with first class characteristics. The easiness of the manufacture is based on the fact that the whole parachute can be made of uniform triangular gores. The placing of the gores side by side and heat seaming is faster and easier than the assembling of any known parachute type. The inexpensive material adds to the cost advantage of this parachute. These advantages have been enabled by the invented pattern and sizing of the holes, which have caused the stability and the low opening shock of this parachute.

The inventive parachutes can be manufactured even more inexpensively by cutting the canopy as a single piece from up to 4–5 meters wide plastic film roll material. This enables diameters respectively of 4–5 meters, which apply for small cargo parachutes and aircraft brake chutes. This kind of single piece canopies can be reinforced by seaming radial reinforcements onto the canopy. Another possibility is to first make a large enough single piece of plastic film by seaming side by side many narrower film strips and then to cut the canopy as a single piece. This canopy could then be radially reinforced as previously described.

When higher strength is required, one can manufacture the parachute from essentially non-porous textile cloth by sewing or with fabric reinforced plastic film. Also in these cases the invented parachute type is advantageous, because otherwise the material strength requirement would be even higher.

While specific embodiments of the invention have been shown and described in detail to illustrate the application of the principles of the invention, it will be understood that the invention may be embodied otherwise without departing from such principles.

What is claimed is:

1. A parachute which can withstand high pressure loading comprising, a non-porous canopy having an outer peripheral skirt and a substantially centrally located vent opening, said canopy including a plurality of circumferentially spaced holes each positioned at a selected radial distance from said vent opening, said plurality of holes all disposed in a zone of said canopy which is confined between 40 and 80% of the radial distance from the center of said vent opening to said skirt, the total area of said holes being from 10 to 25% of the total area of said canopy, said canopy comprising a plurality of circumferentially disposed substantially triangular gores connected to each other at seams extending radially from said vent opening to said skirt, each of said gores having a width in said vent opening which is substantially larger than $D_v\sin(180°/N)$, where $D_v$ is the diameter of said vent opening and N is the number of gores comprising said canopy, each seam between adjacent gores being substantially a straight line.

2. A parachute according to claim 1, wherein said holes in said confined zone are disposed between said seams and in said gores whereby said holes do not reach or weaken said seams.

3. A parachute according to claim 1, wherein said holes are each disposed at a radial distance from the center of said vent of about 65% of the total radial distance between the center of said vent and said skirt.

4. A parachute according to claim 2, wherein said holes are circumferentially spaced and round in shape with one hole disposed in each of said gores.

5. A parachute according to claim 3, further including a second circular row of circumferentially spaced holes of a total area smaller than the total area of said first mentioned plurality of holes positioned in said zone radially inwardly of said first mentioned plurality of holes.

6. A parachute according to claim 1, wherein the canopy is made of a plastic film.

7. A parachute according to claim 6, wherein the plastic film includes a fabric reinforcement.

8. A parachute according to claim 2, wherein said triangular gores are each made of plastic film with the plastic film gores being heat-sealed to each other along said seams.

9. A parachute according to claim 1, wherein said canopy is made of non-porous textile cloth.

* * * * *